United States Patent [19]

Huber

[11] Patent Number: 5,772,790
[45] Date of Patent: Jun. 30, 1998

[54] METHODS AND COMPOSITIONS FOR REMOVING HMPUR RESIDUES

[75] Inventor: Lee M. Huber, Cary, N.C.

[73] Assignee: Reichhold Chemicals, Inc., Research Triangle Park, N.C.

[21] Appl. No.: 670,596

[22] Filed: Jun. 26, 1996

[51] Int. Cl.$^6$ .................................................. B08B 3/14
[52] U.S. Cl. ................................. 134/42; 134/38; 134/40; 252/162; 252/174.23; 521/159; 525/127; 525/130; 528/44; 528/49
[58] Field of Search ................................ 134/38, 40, 42; 252/162, 174.23; 521/159; 525/127, 130; 528/44, 49

[56] References Cited

U.S. PATENT DOCUMENTS

| | | | |
|---|---|---|---|
| 4,731,126 | 3/1988 | Dixit et al. | 134/38 |
| 4,838,945 | 6/1989 | Fujii et al. | 134/7 |
| 4,838,948 | 6/1989 | Bailey | 134/8 |
| 4,863,524 | 9/1989 | Kombashiri et al. | 134/22.19 |
| 4,976,788 | 12/1990 | Nohr et al. | 134/5 |
| 5,021,507 | 6/1991 | Stanley et al. | 525/127 |
| 5,064,557 | 11/1991 | Fusiak | 252/162 |
| 5,124,383 | 6/1992 | Obama et al. | 524/115 |
| 5,145,597 | 9/1992 | Rodriguez et al. | 252/135 |
| 5,190,607 | 3/1993 | Werner et al. | 156/331.1 |
| 5,238,608 | 8/1993 | Obama et al. | 252/535 |
| 5,298,078 | 3/1994 | Itoh et al. | 134/9 |
| 5,342,873 | 8/1994 | Merz et al. | 524/425 |
| 5,348,680 | 9/1994 | Maitz | 252/162 |
| 5,415,799 | 5/1995 | Maitz | 252/162 |
| 5,441,808 | 8/1995 | Anderson et al. | 428/349 |

*Primary Examiner*—Jeffrey Stucker
*Attorney, Agent, or Firm*—Myers Bigel Sibley & Sajovec, LLP

[57] ABSTRACT

A method and a composition for removing HMPUR adhesives having isocyanate groups available for reaction are provided. The composition comprises an amine additive capable of reaction with isocyanate groups of the HMPUR adhesives to be removed and a noncurable polyurethane prepolymer which does not react with the isocyanate groups of the HMPUR adhesives.

18 Claims, No Drawings

5,772,790

METHODS AND COMPOSITIONS FOR REMOVING HMPUR RESIDUES

FIELD OF THE INVENTION

The present invention relates to removing hot melt polyurethane reactive ("HMPUR") adhesives, and more particularly to methods and compositions for doing the same.

BACKGROUND OF THE INVENTION

The production and processing of various polymeric materials typically leaves residues of the polymer or a degradation product thereof. Continued accumulation of the polymer and degradation product can impede further use of the processing or application equipment. Often the equipment must be turned off and operations discontinued in order to clean the equipment.

Various ways of cleaning equipment have been suggested but none have been entirely adequate. For example, one method is to dismantle the equipment and either clean the equipment mechanically (e.g., a wire brush or scraper) or with an abrasive. These methods tend to be time-consuming and labor intensive. Another unsuccessful solution is to use a solvent-based or caustic cleaning composition. These compositions often require elevated temperatures (e.g., greater than 250° C.), with potentially hazardous fumes often being emitted. Moreover, these compositions do not react chemically with the polymers and the cleaning compositions themselves can be difficult to remove.

These methods of cleaning residues, as detailed above, do not work for most polymer equipment, and are particularly ineffective in removing HMPUR adhesives from processing equipment, particularly application equipment. Several methods for removing various hot melt adhesives have been suggested, such as those proposed in U.S. Pat. Nos. 5,348,680 and 5,415,799 to Maitz. The patents describe prior cleaning compositions comprising a mixture of an ethyl vinyl acetate polymer and a resin compound. The patents allege that the EVA polymer does not mix well with conventional PUR hot melt adhesives, and that the hot melt adhesive, due to its still reactive isocyanate functionality, continues to react in the mixture to give crosslinked products which are very difficult to remove since they are unmeltable and essentially insoluble in the composition, and therefore form deposits.

The patents propose compositions which allegedly exhibit improved miscibility with an HMPUR. The compositions are stated to comprise at least one reactive monohydroxy functional compound (e.g., abietyl alcohol) which may react with the free isocyanate groups of the HMPUR adhesive and a non-reacting mass comprising a polyurethane free of isocyanate groups. In spite of any above possible advantage with respect to miscibility, the monohydroxy functional compound displays limited reactivity with the isocyanate groups of the adhesive. Accordingly, the isocyanate groups of the adhesive may cure to form insoluble materials which block equipment passageways.

In view of the above, it would be desirable to provide a composition for removing HMPUR adhesives wherein the composition is highly miscible in the adhesives so as to facilitate easy removal of the above adhesives from equipment.

It would also be desirable to provide a composition for removing HMPUR adhesives in which the composition comprises a component which is highly reactive with free isocyanate groups contained in the adhesives to minimize equipment plugging.

SUMMARY OF THE INVENTION

In view of the above, it is an object of the present invention to provide a composition for removing HMPUR adhesives which is highly miscible in the adhesives.

It is a further object of the present invention to provide a composition for removing HMPUR adhesives which contain a component which is highly reactive with the free isocyanate groups of the adhesives.

These and other objects, features and advantages are provided by the composition of the present invention. The composition comprises an amine additive capable of reaction with the isocyanate groups of the HMPUR adhesives to be removed, and a noncurable polyurethane prepolymer which does not react with the isocyanate groups of the HMPUR adhesives. Preferably, the amine additive is a primary or secondary amine. More particularly, the primary or secondary amine may be selected from the group consisting of dodecaneamine, hexadecaneamine, cocoalkylamine, bis(dodecyl)amine, dodecylaniline, octadecane amine, N-methyl hexadecane amine, N-butyl aniline, and mixtures thereof.

The present invention also provides a method of forming the composition. The method comprises providing a noncurable polyurethane prepolymer which does not react with the isocyanate groups of the HMPUR adhesives, heating the noncurable polyurethane to form a liquid, and dispersing an amine additive capable of reacting with the isocyanate groups of the HMPUR adhesives into the liquid noncurable polyurethane.

The present invention further provides a method of removing HMPUR adhesives having isocyanate groups available for reaction. The method comprises contacting a cleaning composition with a surface of processing or production equipment contaminated with the HMPUR adhesives. The cleaning composition comprises an amine additive capable of reaction with the isocyanate groups of the HMPUR adhesives to be removed and a noncurable polyurethane prepolymer which does not react with the isocyanate groups of the HMPUR adhesives.

DETAILED DESCRIPTION OF THE INVENTION

The present invention will now be described more fully hereinafter with reference to the preferred embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

The present invention relates to a composition suitable for removing HMPUR adhesives. Such adhesives include all of those which have isocyanate groups available for reaction. Specifically, the composition comprises an amine additive capable of reaction with the isocyanate groups of the HMPUR adhesives to be removed and a noncurable polyurethane prepolymer which does not react with the isocyanate groups of the HMPUR adhesives.

The amine additive which is capable of reaction with the isocyante groups of the HMPUR adhesives may encompass all those which are known and suitable. Preferably, the amine additive employed is a primary or secondary amine. Exemplary amines include dodecaneamine, hexadecaneamine, cocoalkylamine, bis(dodecylamine), dodecylaniline, and octadecane amine, N-methyl hexadecane amine, N-butyl aniline. Mixtures of the above may also be used. The amine additive is preferably present in amounts ranging from about 0.05 to 0.5 meq per gm of composition.

A noncurable polyurethane prepolymer formed in accordance with any known and suitable reaction may be used in the composition of the present invention. The term "noncurable" refers to the prepolymer being substantially capped to be prevented from curing. For example, the noncurable polyurethane prepolymer may be formed by reacting a polyurethane prepolymer having preferably from about 1 to 5 percent unreacted isocyanate groups with a capping compound having monofunctional active hydrogens. More preferably, the polyurethane prepolymer contains from about 1.5 to 3.5 percent unreacted isocyanate groups. Any capping compound having monofunctional active hydrogens may be employed including an alcohol or an amine. Suitable alcohols include monovalent alcohols such as, for example, isopropanol, methanol, ethanol, butanol, propanol, benzyl alcohol, and mixtures thereof. Suitable amines which may be used are numerous and include, but are not limited to, secondary and tertiary amines such as dodecaneamine, hexadecaneamine, cocoalkylamine, bis(dodecyl)amine, dodecylaniline, octadecane amine, N-methyl hexadecane amine, N-butyl aniline, methyl amine, ethyl amine, propyl amine, and aniline. The noncurable polyurethane prepolymer is preferably used in an amount, based on the weight of the composition, ranging from about 85 to 98 weight percent.

The polyurethane prepolymer which is subsequently end capped is prepared according to any suitable reaction. For example, the urethane prepolymer may be prepared by the condensation reaction of a polyfunctional isocyanate and a polyfunctional alcohol. Any suitable polyfunctional isocyanate may be used including, for example, ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,4'-diphenylmethane diisocyanate, 2,4-diphenylmethane diisocyanate, poly (isocyanato phenylmethylene), 2,2-diphenylpropane-4,4'-diisocyanate, p-phenylene diisocyanate, m-phenylene diisocyanate, xylene diisocyanate, 1.4-naphthlene diisocyanate, 1,5-naphthlene diisocyanate, diphenyl-4,4'-diisocyanate, azobenzene-4,4'-diisocyanate, diphenyl sulphone-4,4'-diisocyanate, dichloro hexamethylene diisocyanate, furfurylidene diisocyanate, 1-chloro benzene-2,4-diisocyanate, 4,4',4"-triisocyanato-triphenylmethane, 1,3,5-triisocyanato-benzene, 2,4,6-triisocyanato-toluene, and 4,4'-dimethyldiphenyl methane-2,2',5,5-tetraisocyanate. Mixtures of any of the above may be employed. The polyfunctional isocyanate is used in proportions such that the isocyanate content of the urethane prepolymer preferably ranges from about 1 to 5 percent based on the weight of the urethane prepolymer, and more preferably from about 1.5 to 3.5 percent.

Known and suitable polyfunctional alcohols may be employed including, for example, polyhydroxy ethers, (e.g., polyalkylene ether glycols and polyhydroxy polyalkylene ethers); polyhydroxy polyesters; alkylene oxide inclusion complexes of polyfunctional alcohols; and the monosubstituted esters of glycerol. The polyfunctional alcohol is preferably employed in an amount ranging from about 60 to 95 percent based on the weight of the polyurethane prepolymer.

For the purposes of the invention, the polyurethane prepolymer may be prepared with a polyfunctional isocyanate which includes compounds containing other types of functionalities including polymercapto-containing components (e.g., polythioethers) and polyamino components (e.g., diamino polyethylene glycol). Low molecular weight dihydroxy, diamino, or aminohydroxy compounds may also be used in suitable amounts.

The composition of the present invention may also include other components suitable for adjusting the physical and processing properties of the composition. Such components include resins, waxes, plasticizers, and various non-isocyanate reacting polymers. Advantageously, a coloring agent may be added to the composition to allow the composition to be distinguished from the adhesive which is to be purged.

The present invention also relates to a method of forming a composition for removing HMPUR adhesives which have isocyanate groups available for reaction. The method includes providing a noncurable polyurethane prepolymer which does not react with the isocyanate groups of the HMPUR adhesive, heating the noncurable polyurethane prepolymer to form a liquid, and dispersing an amine additive capable of reacting with the isocyanate groups of the HMPUR adhesive into the liquid noncurable polyurethane prepolymer.

The above method may occur in any appropriate vessel. Typically, a glass or stainless steel reactor is employed. The heating step of the above method can be carried out utilizing known heating means in which the noncurable polyurethane prepolymer is preferably heated to a temperature from about 60° to 125° C., and more preferably, from about 90° to 125° C. for a time ranging from about 0.5 to 2 hours. The resulting viscosity of the noncurable polyurethane prepolymer ranges from about 500 cPs to 50,000 cPs measured at 250° C. using a Brookfield Thermosel under standard procedure.

Most preferably, the amine additive is added to the non-curable polyurethane prepolymer which is present in the reactor in which it has been manufactured. The non-curable polyurethane prepolymer is already melted at this time and the amine additive may thus be readily dispersed in it.

In particular, the amine additive is preferably stirred into the reactor at a temperature ranging from about 90° to 125° C. for a time ranging from about 0.1 to 1 hours. Subsequent to its formation, the composition is typically cooled, and stored and transported for commercial use in solid form in drums, pails, cartridges, and the like. The composition may be present in the form of pellets or "chicklets" which can be added to unloaders, rolls, pots, and the like and thus used. Advantageously, the composition has a melting point of below about 250° C. so that it may be used as a liquid at a temperature typically employed in HMPUR equipment.

The invention also relates to a method for removing HMPUR adhesives having isocyanate groups available for reaction with the composition of the invention. Typically, the composition is provided in a molten liquid state to a surface of a piece of processing or production equipment containing the HMPUR adhesive. The composition is used at a temperature typically above about 80° C. Such pieces of processing or production equipment include, for example, any machine, apparatus, or device upon which HMPUR adhesives may accumulate. The composition contacts the surface and the HMPUR adhesives contained thereon. Since the composition is similar in makeup to the HMPUR adhesives, the adhesives exhibit miscibility in the composition. The composition may remain in contact with the HMPUR adhesives for a length of time desired for cleaning, typically from about 0.1 to 10 hours. The composition containing the HMPUR adhesives is then transported and disposed of in any suitable fashion.

The invention can be further illustrated by the following examples of preferred embodiments thereof, although it will be understood that these examples are included merely for purposes of illustration and are not intended to limit the scope of the invention.

EXAMPLES

Example A

1. Formation of Polyurethane Precursor

The following materials are blended in a 90 liter glass reactor:

| | |
|---|---|
| Hexanediol/adipic acid polymer (4000 MW) | 26.044 Kg. |
| Polypropylene glycol (1000 MW) | 1.355 Kg. |
| Polycaprolactone (40,000 MW) | 1.129 Kg. |

These materials are mixed at 120° C. for about 60 minutes. The mixture is then cooled to about 80° C. and the following diisocyanate is added with rapid mixing:

| | |
|---|---|
| Methylenedi (phenylisocyanate) (MDI) | 5.269 Kg. |

These materials are reacted for 2.5 hours at temperatures up to 94° C. The viscosity is 4,475 cPs and the percent NCO is 3.15 percent. In order to cap off the isocyanate, the following amount of isopropanol with dissolved blue coloring is added to the mixture.

| | |
|---|---|
| Isopropanol | 2.145 Kg. |
| Blue dye | .0015 Kg. |

After the completion of this reaction, the viscosity is 5,300 cPs and the percent NCO is 0.11 percent. This indicated that the reaction is essentially complete. The excess isopropanol was then stripped off. The following amount of N-methyl pyrrolidone is then added and mixed.

| | |
|---|---|
| N-methyl pyrrolidone | 0.376 Kg. |

The product, which is liquid at about 80° C., has medium blue color.

2. Formation of Cleaning Composition A 12 g of 1-aminododecane is added to 188 g of the above composition. The result is a clear blue melt with a viscosity of 2250 cps at 250° F. and a measured amine content (by titration with 0.5N HCl) of 0.318 meq/g as compared to a calculated value of 0.32 meq/g.

3. Cleaning Test

In order to check the performance of this material it was mixed with a hot melt polyurethane adhesive having a viscosity of 10,000 cps at 250° F. and 2.2% residual isocyanates as follows:

| | |
|---|---|
| Polyurethane Adhesive | 50.6 g. |
| Cleaning Composition A | 150 g. |

The viscosity of this mixture is initially 8,200 cps at 250° F. and dropped to 6,700 over the course of an hour at this temperature. The amine content of this mixture is calculated to be 0.108 meq/g and is measured to be 0.151 meq/g indicating the isocyanate is being neutralized by the amine. A sample is left in an oven at 250° F. for 16 hours and is fluid at the end of this time.

Example B

The polyurethane precursor is made as in Example A to 184 g of polyurethane.

The precursor is melted at 250° F. and 16 g of 1-aminooctadecane amine is added and stirred. Initially the mixture was hazy but became clear within about 1 hour. The viscosity at 250° F. was measured to be 1500 cps and the amine content was 0.279 meq/g as compared to a calculated value of 0.297 meq/g.

Example C

The polyurethane precursor is made as in Example A to 0.90 Kg of 1-aminohexadecane. The precursor is melted at 250° F. The mixture is clear and has very little amine odor. The viscosity at a 250° F. is measured to be 2125 cps and the amine content is 0.278 meq/g as compared to calculated value of 0.280 meq/g.

This material is formed into about 200 g pieces and then used in purging a roll coater with a gravure imprinted roll. It was found to be very efficient in cleaning the roll of hot melt polyurethane adhesive. The cleaning composition of Example B material, which is similar but has no amine added, had been previously used in attempts to clean these rolls and was found to leave residue of cured hot melt polyurethane adhesive on the roll.

Example D

A composition was made using 5.8% of monococoalkylamine. The viscosity at 250° F. was measured to be 2275 cps and the amine content was 0.275 meq/g vs. a calculated value of 0.213 meq/g.

As demonstrated by the Examples and explained in the Specification, the composition of the present invention is highly advantageous. More specifically for example, the presence of an amine additive in the composition allows for reaction with the isocyanate functionality in the polyurethane prepolymer so as to cap the prepolymer and prevent it from reacting and curing with HMPUR adhesives. As such, the composition minimizes setting up of the adhesives and blocking of equipment. The amine is more reactive than monofunctional alcohols which have been known to be employed for capping polyurethanes. Moreover, the composition is similar in makeup to HMPUR adhesives such that the adhesives are highly miscible in the composition. Accordingly, the adhesives are compatible with the composition to allow for improved cleaning and purging of adhesives from equipment.

In the specification, there have been disclosed typical preferred embodiments of the invention and, although specific terms are employed, they are used in a generic and descriptive sense only and not for purposes of limitation, the scope of the invention being set forth in the following claims.

What is claimed is:

1. A composition for removing hot melt polyurethane reactive (HMPUR) adhesives having isocyanate groups available for reaction, said composition comprising:

a monofunctional amine additive capable of reaction with the isocyanate groups of the HMPUR adhesives to be removed; and a noncurable polyurethane prepolymer which does not react with the isocyanate groups of the HMPUR adhesives.

2. The composition of claim 1 wherein said amine additive is a primary or secondary amine.

3. The composition of claim 2 wherein said amine additive is selected from the group consisting of dodecaneamine, hexadecaneamine, cocoalkylamine, bis(dodecyl)amine, dodecylaniline, octadecane amine, N-methyl hexadecane amine, N-butyl aniline, and mixtures thereof.

4. The composition of claim 1 further comprising a coloring agent.

5. The composition of claim 1 wherein the noncurable polyurethane prepolymer is formed by reacting a polyurethane having about 1 to 5 percent of unreacted isocyanate groups with a capping compound having monofunctional active hydrogens.

6. The composition of claim 5 wherein the capping compound having monofunctional active hydrogens is an alcohol or an amine.

7. The composition of claim 6 wherein the amine additive is a primary or secondary amine.

8. The composition of claim 7 wherein the primary or secondary amine additive is selected from the group consisting of dodecaneamine, hexadecaneamine, cocoalkylamine, bis(dodecyl)amine, dodecylaniline, octadecane amine, N-methyl hexadecane amine, N-butyl aniline, and mixtures thereof.

9. The composition of claim 1 wherein said composition has a melting point below about 250° C.

10. The composition of claim 1 wherein said composition has a viscosity ranging from about 500 cPs to 50,000 cPs measured at 250° C.

11. A method of forming a composition for removing hot melt polyurethane reactive (HMPUR) adhesives having isocyanate groups available for reaction, the method comprising:

providing a noncurable polyurethane prepolymer which does not react with the isocyanate groups of the HMPUR adhesives;

heating the noncurable polyurethane prepolymer to form a liquid; and dispersing a monofunctional amine additive capable of reacting with the isocyanate groups of the HMPUR adhesives into the liquid noncurable polyurethane.

12. The method of claim 11 wherein said step of heating the noncurable polyurethane to form a liquid occurs at a temperature ranging from about 60° to 125° C.

13. The method of claim 11 wherein said step of heating the noncurable polyurethane prepolymer provides a liquid having a viscosity ranging from about 500 cPs to 50,000 cPs measured at 250° C.

14. The method of claim 11 wherein the amine additive is a primary or secondary amine.

15. The method of claim 14 wherein the amine is selected from the group consisting of dodecaneamine, hexadecaneamine, cocoalkylamine, bis(dodecyl)amine, dodecylaniline, octadecane amine, N-methyl hexadecane amine, N-butyl aniline, and mixtures thereof.

16. A method of removing hot melt polyurethane reactive (HMPUR) adhesives having isocyanate groups available for reaction, the method comprising:

contacting a cleaning composition with a surface of production or processing equipment contaminated with the HMPUR adhesives, the cleaning composition comprising a noncurable polyurethane prepolymer which does not react with the isocyanate groups of the HMPUR adhesives and a monofunctional amine additive capable of reacting with the isocyanate groups of the HMPUR adhesives, wherein the composition removes the HMPUR adhesive from the surface of production or processing equipment.

17. The method of claim 16 wherein the amine additive is a primary or secondary amine.

18. The method of claim 17 wherein the amine is selected from the group consisting of dodecaneamine, hexadecaneamine, cocoalkylamine, bis(dodecyl)amine, dodecylaniline, octadecane amine, N-methyl hexadecane amine, N-butyl aniline, and mixtures thereof.

* * * * *